United States Patent
Gall et al.

(10) Patent No.: US 11,338,489 B2
(45) Date of Patent: May 24, 2022

(54) METHOD TO TEMPER THE SURFACE HARDNESS OF ACRYLIC OR OTHER PLASTIC AUTOMOTIVE APPLIQUES

(71) Applicant: Ford Global Technologies, LLC, Dearborn, MI (US)

(72) Inventors: Richard Gall, Ann Arbor, MI (US); Paul Kenneth Dellock, Northville, MI (US); Stuart C. Salter, White Lake, MI (US); Dave Brian Glickman, Southfield, MI (US); Chester Stanislaus Walawender, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 170 days.

(21) Appl. No.: 16/534,484

(22) Filed: Aug. 7, 2019

(65) Prior Publication Data
US 2021/0039294 A1 Feb. 11, 2021

(51) Int. Cl.
| | |
|---|---|
| *B29C 45/26* | (2006.01) |
| *B29C 45/73* | (2006.01) |
| *B29C 45/00* | (2006.01) |
| B29L 31/30 | (2006.01) |
| B29K 33/00 | (2006.01) |

(52) U.S. Cl.
CPC .......... *B29C 45/73* (2013.01); *B29C 45/0001* (2013.01); *B29K 2033/12* (2013.01); *B29L 2031/30* (2013.01)

(58) Field of Classification Search
None
See application file for complete search history.

(56) References Cited

U.S. PATENT DOCUMENTS

| | | | |
|---|---|---|---|
| 5,338,497 A | 8/1994 | Murray et al. | |
| 6,497,947 B1 | 12/2002 | Blais et al. | |
| 6,846,445 B2 | 1/2005 | Kim et al. | |
| 8,021,135 B2 * | 9/2011 | Anbarasu | B29C 35/0805 425/3 |
| 9,199,398 B2 | 12/2015 | Schmidt et al. | |
| 9,862,132 B2 | 1/2018 | Feigenblum et al. | |
| 2010/0201040 A1 | 8/2010 | Guichard et al. | |
| 2018/0056551 A1 | 3/2018 | Droste | |

FOREIGN PATENT DOCUMENTS

| | | |
|---|---|---|
| DE | 20121777 | 6/2003 |
| DE | 102010052180 | 5/2012 |

* cited by examiner

*Primary Examiner* — Edmund H Lee
(74) *Attorney, Agent, or Firm* — Burris Law, PLLC

(57) ABSTRACT

Methods for preparing thermoplastic automotive appliques include applying heat from an auxiliary heater to a tool cavity of a forming tool. The auxiliary heater is activated for a period of time until a temperature of the heated tool cavity is heated to less than or equal to about a melting temperature of the thermoplastic. The heated tool cavity is filled with the thermoplastic, and a cooling fluid is pulsed through the forming tool. The thermoplastic applique is then removed, and the supply of cooling fluid is turned off.

20 Claims, 4 Drawing Sheets

METHOD TO TEMPER THE SURFACE HARDNESS OF ACRYLIC OR OTHER PLASTIC AUTOMOTIVE APPLIQUES

FIELD

The present disclosure relates to scratch resistant appliques and in particular for use in automotive vehicles for improved interior or exterior appearance.

BACKGROUND

The statements in this section merely provide background information related to the present disclosure and may not constitute prior art.

Referring to FIG. 1, a representative high gloss black pillar applique 10, which is typically used in automobile applications, provides a premium and/or luxurious interior or exterior appearance of an automobile. Appliques, like applique 10, are highly visible to some customers upon approaching an automobile from the side or when entering the automobile through a door.

To maintain their premium, luxurious appearance, appliques should be resistant to scratching and marring, which can come from seemingly innocuous sources, such as car wash brushes. Conventional approaches to forming steel, aluminum, or plastic appliques include high gloss black paint or powder-coated surfaces. But while such appliques have adequate scratch resistance, such appliques are expensive and, like most painted parts, can exhibit "orange peel" finishes that are not desirable.

Another conventional applique forming process involves hard-coating injection molded acrylics or polycarbonates, or other polymers. But such hard-coated appliques are expensive, can double the cost of a molded part, and are subject to degradation by certain car wash solutions.

Yet another conventional applique forming process involves mold-in-color acrylics polycarbonates, or other polymers. Such appliques do not exhibit good scratch resistance and accordingly lose their luxurious appearance over time. In such applique forming processes, poly(methyl methacrylate) ("PMMA") materials, polycarbonate, or other polymers are heated in molds to a temperature of greater than or equal to about 35° C. to less than or equal to about 80° C. These appliques have only fair abrasion resistance, and there can be inconsistencies along the surface of the resultant applique of abrasion resistance.

These issues related to forming appliques that have a premium/luxurious appearance are addressed by the present disclosure.

SUMMARY

According to a form, a method of forming appliques from a poly(methyl methacrylate) ("PMMA") material includes applying heat from an auxiliary heat source to a heated tool cavity of a forming tool. The auxiliary heat source is activated for a period of time until a temperature of the heated tool cavity is heated to less than or equal to about a melting temperature of the PMMA material to greater than or equal to about 5° C. below the melting temperature of the PMMA material. The heated tool cavity is then filled with the PMMA material, after which a cooling fluid is pulsed through the forming tool. A PMMA applique is removed.

In a variation, removing the PMMA applique occurs when the temperature of the heated tool cavity falls to about 80° C.

In another variation, the PMMA applique retains greater than or equal to about 80% gloss retention.

In yet another variation, the applied heat is supplied from a plurality of auxiliary induction heating elements.

In a further variation, the cooling fluid is water at a temperature of about 5° C.

In another further variation, the forming tool is an injection mold.

According to another form, a method of forming appliques from a poly(methyl methacrylate) ("PMMA") material includes induction heating a cavity surface of an injection mold to greater than or equal to about 115° C. to less than or equal to about 165° C. The injection mold is then filled with the PMMA material and the temperature of the cavity surface of the injection mold is maintained at greater than or equal to about 115° C. to less than or equal to about 165° C. while filling the injection mold with the PMMA material. When the injection mold is filled with the PMMA material, a cooling fluid is pulsed through the injection mold. A PMMA applique is removed from the injection mold once the cavity surface of the injection mold reaches less than or equal to about 80° C.

In a variation, the PMMA applique retains greater than or equal to about 70% gloss retention.

In another variation, the PMMA applique retains greater than or equal to about 80% gloss retention.

In yet another variation, induction heating the cavity surface is accomplished from at least an auxiliary induction heating element.

In a further variation, the cooling fluid is water at a temperature of about 5° C.

In yet a further variation, the PMMA material is held within the mold for a predetermined time.

In a further form, a method of forming appliques from a thermoplastic material includes applying heat from an auxiliary heater to a heated tool cavity of a forming tool. The auxiliary heater is activated for a period of time until a temperature of the heated tool cavity is heated to less than or equal to about a melting temperature of the thermoplastic material to greater than or equal to about 5° C. below the melting temperature of the thermoplastic material. The heated tool cavity is filled with the thermoplastic material, after which a cooling fluid is pulsed through the forming tool. A thermoplastic applique is then removed.

In a variation, the thermoplastic applique is removed when the temperature of the heated tool cavity falls to about 80° C.

In another variation, the thermoplastic applique retains greater than or equal to about 70% gloss retention.

In yet another variation, the thermoplastic applique retains greater than or equal to about 80% gloss retention.

In a further variation, the applied heat is from a plurality of auxiliary induction heating elements.

In a yet further variation, the cooling fluid is water at a temperature of about 5° C.

In a still further variation, the forming tool is an injection mold.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
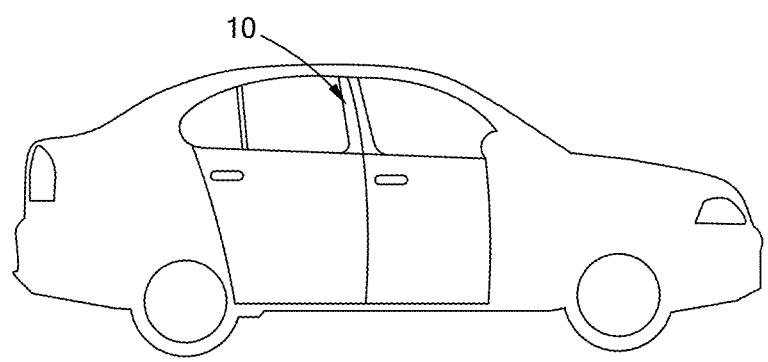
FIG. 1 is a schematic drawing of a pillar applique in an automobile according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
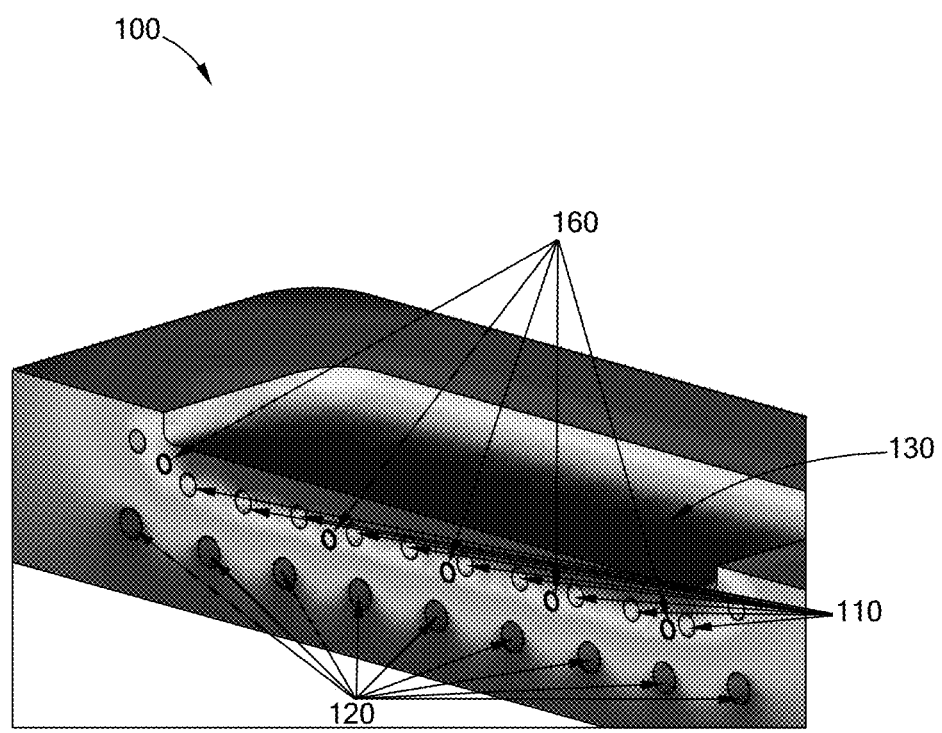
FIG. 2 is a schematic drawing of a portion of a mold for processing appliques according to the present disclosure, schematically illustrating an example path of induction heating elements residing within the mold.
Figure 3:
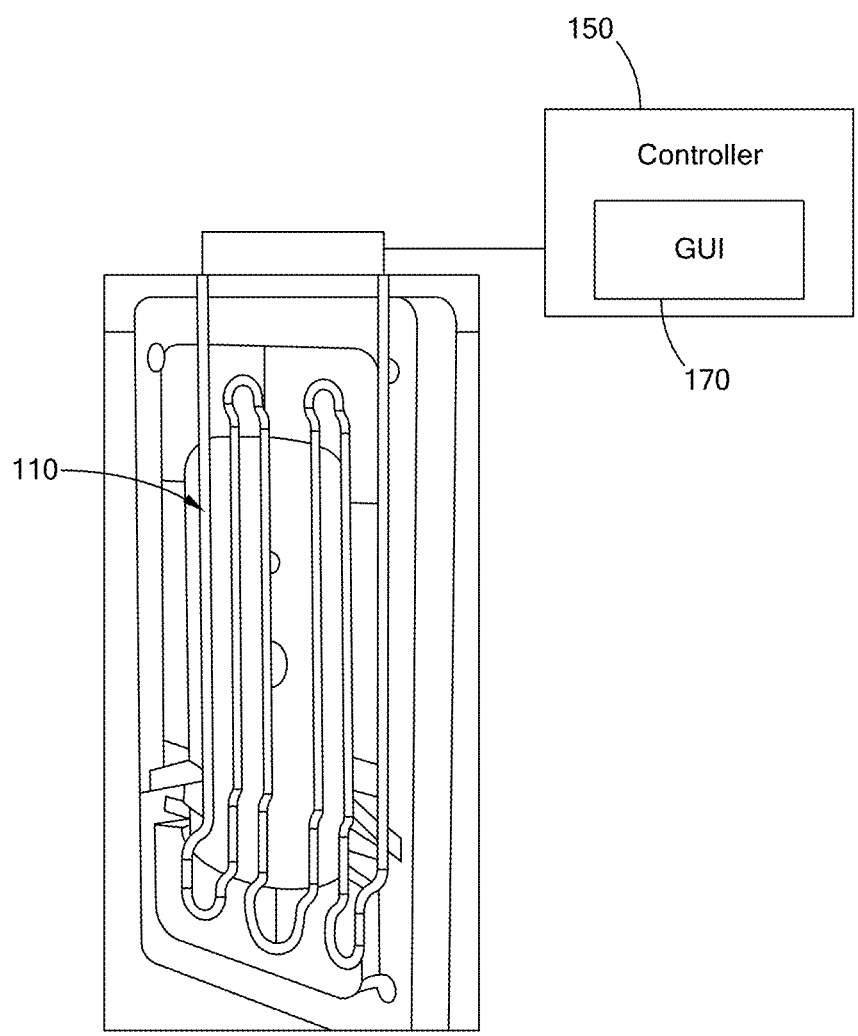
FIG. 3 is a schematic drawing showing the induction heating elements residing behind the cavity surface of a mold according to the present disclosure.

Referring to FIGS. 2 and 3, a portion of a forming tool 100 is illustrated. In the example provided, the forming tool 100 is a mold and is referred to hereinafter as the mold 100. The mold 100 may be constructed of steel, aluminum, or other metals or metal alloys and includes induction heating elements 110, which in one form are generally evenly spaced apart from one another and serve as an auxiliary heat source, and fluid cooling lines 120, which are also in this form generally evenly spaced apart from each other. The mold 100 can be an injection mold, compression mold, or other forming tools that can hold liquified PMMA materials, polycarbonates, thermoplastics, or other polymers. Generally, the mold 100 is disposed within a heated press (not shown, and providing primary heat to create a heated tool cavity), along with a mating mold (not shown) that includes surfaces that generally match the surfaces of the mold 100 with an offset that defines the part thickness(es).

The induction heating elements 110 heat a cavity surface 130 of the mold 100 to about the melting temperature of the acrylic or polymer that is to be molded into an applique and hold the temperature to about the melting temperature of that acrylic or polymer that is to be molded into the applique until the mold 100 is filled with the acrylic or polymer. Therefore, by way of nonlimiting example, when the applique is to be formed of a PMMA material, the cavity surface 130 of the mold 100 may be heated to about 160° C., and the induction heating elements 110 maintain the temperature of the cavity surface 130 at about 160° C. until the mold 100 is filled to a predetermined and/or desired volume with the PMMA material. According to a variation, when the applique is to be formed of a PMMA material, the temperature of the cavity surface 130 may be heated to greater than or equal to about 140° C. to less than or equal to about 165° C., and the induction heating elements 110 maintain the temperature of the cavity surface 130 at greater than or equal to about 140° C. to less than or equal to about 165° C. until the mold 100 is filled with the PMMA material. According to yet another variation, when the applique is to be formed of a PMMA material, the temperature of the cavity surface 130 may be heated to greater than or equal to about 115° C. to less than or equal to about 165° C., and the induction heating elements 110 maintain the temperature of the cavity surface 130 at greater than or equal to about 115° C. to less than or equal to about 165° C. until the mold 100 is filled with the PMMA material Referring to FIGS. 2 and 3, the induction heating elements 110 in one form wind in a serpentine pattern as shown behind the cavity surface 130, which may be paired to a feedback control loop controlled by a controller 150. In this manner, the temperature of the cavity surface 130 can be set by a machine operator, by a predetermined program, or the like. A controller 150 generally receives input from the sensors 160, so as to stop providing power to the induction heating elements 110 to heat the cavity surface 130 once the mold 100 is filled and is at the correct predetermined temperature. If warranted, such as for larger parts, multiple induction heating elements 110 may each be connected with respective sensors (such as sensors 160) and the controller 150, to allow for independent control of specific induction heating elements 110. Alternatively, a controller could control multiple induction heating elements separately.

Once the mold 100 is filled, the cavity surface 130 of the mold 100 is quickly cooled via pulsed fluid cooling. Pulsed fluid cooling as used herein refers to a closed loop system where cooled fluid or water is pumped from a cold water or ambient water source (or other cooling fluid) under pressure at a high rate of speed to a mold to quickly dissipate heat created by the addition of the heated, melted acrylic or polymer. The controller 150, a machine operator, and/or a temperature sensor 160 can determine when the mold 100 is considered to be filled. At that point, the controller may determine to begin pulsed fluid cooling. According to one form, the fluid cooling lines 120 provide pulsed cooling of the cavity surface 130, which in turn cools the surface of the applique residing in the mold 100. The fluid may comprise cold water at about 5° C., and flow into the fluid cooling lines 120 from a cold water source, such as a cold water tower or chiller having water chilled to a temperature of about 5° C. or to a temperature sufficient to provide water at about 5° C. during pulsed fluid cooling. According to an aspect, pulsed fluid cooling cools the cavity surface 130 of the mold 100 at a rate of greater than or equal to about 15° C./sec. Once cavity surface 130 reaches a predetermined temperature (which may be determined by the controller or sensed by a sensor and may be, in a variation, about 80° C.), the surface of the applique in contact with the mold 100 is removed from the cavity surface 130 and then ejected.

To sense temperature, one or more temperature sensors 160 may be located just below the cavity surface 130, and in communication with the controller 150, a graphical user interface (GUI) 170, or the like, for allowing display and/or determination of the temperature of the cavity surface 130. There may be one or more sensors 160 and they may be located as desired. The sensors 160 may comprise thermocouples, fiber optics, RTD sensors, among others. In this manner, each applique-forming cycle can be continuously monitored and can be updated as required. Further, it can be determined when to skin the applique from the cavity surface 130, if any corrections are warranted as a result of faulty heating or cooling, and the like.

Figure 4:
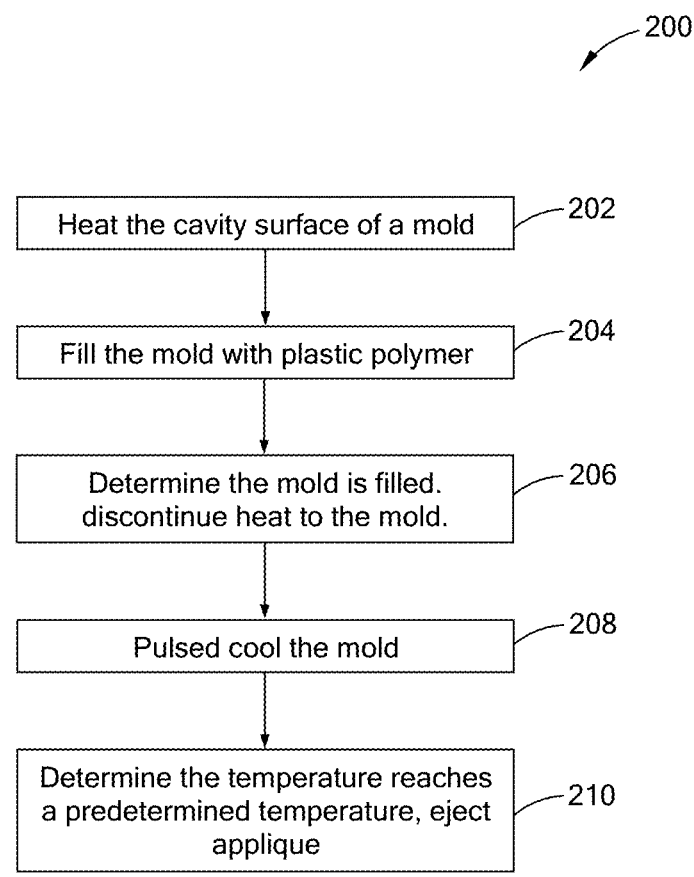
FIG. 4 is a flowchart of a process for forming appliques according to the present disclosure.

Referring to FIG. 4, a flowchart of a routine 200 for preparing an applique according to the present disclosure is provided. At 202, a controller (such as the controller 150) activates at least an auxiliary induction heating element to heat the cavity surface of a mold. At 204, a temperature sensor (such as the temperature sensor 155) senses that the cavity surface of the mold has reached a predetermined temperature, such as a few degrees within the melting point of a PMMA material, polycarbonate, or other polymer to be delivered into the mold. A controller detects the sensed temperature and causes a fill tool (such as an injection mold nozzle) to fill the mold with the PMMA material, polycarbonate, or other polymer, in a liquid state. At 206, it is determined the mold is filled and the controller stops the flow of the liquid PMMA material, polycarbonate, or other polymer into the mold. The controller also causes the at least an auxiliary induction heating element to cease providing heat to the cavity surface. Optionally, the liquid PMMA material, polycarbonates, or other polymers within the mold is packed. Immediately thereafter or contemporaneously therewith, at 208, cooling fluid, such as cold water, is supplied to the mold via fluid cooling lines to pulse cool the mold. At 210, the temperature sensor senses that the cavity surface of the mold has reached a predetermined temperature, the controller detects the sensed temperature, and the controller causes the applique to be removed from the mold. Immediately thereafter or contemporaneously therewith, the controller ceases flow of the supply of cooling fluid into the fluid cooling lines. The controller, if it is determined that making another applique is warranted, may then cause the at least an auxiliary induction heating element to once again supply heat to the mold to heat the mold cavity and repeat the process, thereby returning to 202. Otherwise, the process ends.

The appliques prepared under the present disclosure can be made from PMMA materials, polycarbonates, and other polymers that are capable of forming parts having surfaces having excellent scratch resistance and high gloss. Nonlimiting examples of plastic polymers that are appropriate according to the present disclosure include thermoplastics, including PMMA materials, polycarbonates, polystyrenes, acrylonitrile styrene acrylate ("ASA"), PMMA/ASA blends, polysulfones, thermoplastic polyurethanes, polyethylene terephthalates, poly(vinyl chloride), and acrylonitrile butadiene styrenes. Further, it is contemplated that the present disclosure can be used to form various types of appliques, such as B-pillar appliques, rear panel appliques, side panel appliques, and the like.

Without wishing to be bound to theory, it is believed that heating PMMA materials to about their melting temperature consistently along a surface of a mold and then quickly cooling the PMMA material along that surface increases the crystallinity of the PMMA material and forms an applique with a resin-rich layer on surface of the applique that provides consistent scratch resistance and high gloss along the surface of the PMMA appliques. In this manner, the entire surface of the PMMA applique achieves superior scratch resistance with a high gloss appearance.

The PMMA appliques are accordingly highly durable. To ascertain the durability of such appliques, percent gloss retention measurements via crock testing were obtained. Percent gloss retention of a surface is equal to $Gloss_{final}/Gloss_{initial} \times 100$, where $Gloss_{final}$ is the measurement of gloss units after subjecting a surface to a crock test, and $Gloss_{initial}$ is the measurement of gloss units before subjecting a surface to a crock test. Gloss units can be measured by commercially available gloss meters, and gloss units measurements are typically taken at 20°, 60°, and 85° geometries relative to the surface of the object to be measured, depending on the amount of gloss units. More specifically, 20° angle measurements are appropriate for high gloss surfaces, whereas 85° angle measurements are appropriate for low gloss surfaces. Crock tests vary. One approach to crock testing includes using a crockmeter, which uses a standard pressure and rubbing motion to provide reliable and reproducible test results. According to one crock testing variation, test specimens are positioned on the base of a crockmeter and held in place in a specimen holder. To prevent the test specimen from shifting during testing, a sandpaper pad may be provided under the test specimen. A hand crank moves a reciprocating arm a distance of approximately 100 mm. The rubbing action is provided by a 16 mm diameter acrylic finger, which moves back and forth in a straight line with each complete turn of the crank. The reciprocating load arm is weighted to provide a constant 9 N load on the test specimen at all times and a mechanical counter keeps track of completed cycles. According to the variation above, the test specimen is subjected to 10 complete cranks.

Examples and Comparative Examples

Six samples were formed according to conventional methods by injecting into a mold an acrylic material wherein the temperature of the mold was held at about 82° C. The acrylic material was held in the mold until the mold was filled with acrylic material, at which time the acrylic material was removed from the mold. The gloss units were ascertained using gloss meters at 20°. Percent gloss retention was measured by subjecting the samples to mar resistance determination for automotive coatings tests, which included using a crocking felt in a crockmeter for 10 cranks wherein a 16 mm diameter acrylic member moved back and forth in a straight line with each complete stroke at a constant load weight of 9N. The gloss units were then ascertained using gloss meters at 20° to calculate gloss retention percentages.

Six samples were prepared according to the present disclosure by injecting into a mold an acrylic material wherein the temperature of a cavity surface of the mold was heated with induction heating bands heated across the mold to about 160° C. Heat was continuously supplied to the cavity surface of the mold via the induction heating bands until the mold was filled with acrylic material. Once the mold was filled with acrylic material, the mold was cooled quickly using chilled water at a rate of about 15° C./sec. The samples were removed from the mold when the temperature of the mold was about 80° C. The gloss units were ascertained using gloss meters at 20°. Percent gloss retention was measured by subjecting the samples to mar resistance determination for automotive coatings tests, which included using a crocking felt in a crockmeter for 10 cranks wherein a 16 mm diameter acrylic member moved back and forth in a straight line with each complete stroke at a constant load weight of 9N. The gloss was then analyzed using gloss meters at 20° to determine gloss retention percentages. Table 1 below shows the gloss retention percentages retained for each of the six samples and comparative samples:

TABLE 1

Gloss Retention Properties

| Sample | Gloss Retention | Comparative Sample | Gloss Retention |
|---|---|---|---|
| 1 | 45% | 1 | 79% |
| 2 | 55% | 2 | 77% |
| 3 | 49% | 3 | 82% |
| 4 | 52% | 4 | 80% |
| 5 | 47% | 5 | 77% |
| 6 | 49% | 6 | 81% |

As can be seen in Table 1, appliques made according to conventional processes have inconsistent characteristics along their surfaces and may exhibit different scratch resistances depending on whether the scratches extend across a plane perpendicular with the length of the applique as opposed to scratches extending across a plane parallel with the length of the applique. Such perpendicular and parallel appliques differentials can be particularly problematic in larger appliques, such as rear panel appliques. Further, the retention gloss percentage can differ greatly from one area of a surface of an applique to a different area of a surface of an applique.

Samples made according to the present disclosure, however, offer superior gloss retention. Moreover, the use of induction heating significantly improves the resistance of plastics in color high gloss appliques, so material savings are expected. And painting or coating is not required to achieve the superior gloss retention of the high gloss appliques made according to the present disclosure, providing additional cost savings and negating the likelihood of orange peel. Even further still, the delivery of auxiliary heat from the induction heating elements 110 followed by the quick cooling via the fluid cooling lines 120 allows for faster processing times over conventional methods for producing appliques.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" may be replaced with the term "circuit". The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term code may include software, firmware, and/or microcode, and may refer to programs, routines, functions, classes, data structures, and/or objects. The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of forming appliques from a poly(methyl methacrylate) ("PMMA") material comprising:
    applying heat from an auxiliary heat source to a heated tool cavity of a forming tool;
    activating the auxiliary heat source for a period of time until a temperature of the heated tool cavity is heated to less than or equal to about a melting temperature of the PMMA material to greater than or equal to about 5° C. below the melting temperature of the PMMA material;
    filling the heated tool cavity with the PMMA material;
    then, pulsing a cooling fluid through the forming tool to cool the heated tool cavity; and
    then, removing a PMMA applique, wherein the PMMA applique is free of a painting or coating while the mold is inductively heated.

2. The method according to claim 1, wherein removing the PMMA applique occurs when the temperature of the heated tool cavity falls to about 80° C.

3. The method according to claim 1, wherein the PMMA applique retains greater than or equal to about 70% gloss retention.

4. The method according to claim 1, wherein the PMMA applique retains greater than or equal to about 80% gloss retention.

5. The method according to claim 1, wherein the applied heat is from a plurality of auxiliary induction heating elements.

6. The method according to claim 1, wherein the cooling fluid is water at a temperature of about 5° C., and pulsing the cooling fluid through the forming tool cools the forming tool at a rate of greater than or equal to about 15° C./s.

7. The method according to claim 1, wherein the forming tool is an injection mold.

8. A method of forming appliques from a poly(methyl methacrylate) ("PMMA") material comprising:
    induction heating a cavity surface of an injection mold to greater than or equal to about 115° C. to less than or equal to about 165° C.;
    filling the injection mold with the PMMA material and maintaining the temperature of the cavity surface of the injection mold at greater than or equal to about 115° C. to less than or equal to about 165° C. while filling the injection mold with the PMMA material;
    then, pulsing a cooling fluid through the injection mold after the injection mold is filled with the PMMA material to cool the injection mold at a rate of greater than or equal to about 15° C./s;
    then, removing a PMMA applique from the cooled injection mold once the cooled cavity surface of the injection mold reaches less than or equal to about 80° C.

9. The method according to claim 8, wherein the PMMA applique retains greater than or equal to about 70% gloss retention.

10. The method according to claim 8, wherein the PMMA applique retains greater than or equal to about 80% gloss retention.

11. The method according to claim 8, wherein induction heating the cavity surface is accomplished from at least an auxiliary induction heating element.

12. The method according to claim 8, wherein the cooling fluid is water at a temperature of about 5° C.

13. The method according to claim 8, further comprising holding the PMMA material within the mold for a predetermined time.

14. A method of forming appliques from a thermoplastic material, the method comprising:
    applying heat from an auxiliary heat source to a heated tool cavity of a forming tool;
    activating the auxiliary heat source for a period of time until a temperature of the heated tool cavity is heated to less than or equal to about a melting temperature of the thermoplastic material to greater than or equal to about 5° C. below the melting temperature of the thermoplastic material;

filling the heated tool cavity with the thermoplastic material;

then, pulsing a cooling fluid through the forming tool to cool the heated tool cavity of the forming tool at a rate of greater than or equal to about 15° C./s; and then, removing a thermoplastic applique from the forming tool.

15. The method according to claim 14, wherein removing the thermoplastic applique occurs when the temperature of the heated tool cavity falls to about 80° C.

16. The method according to claim 14, wherein the thermoplastic applique retains greater than or equal to about 70% gloss retention.

17. The method according to claim 14, wherein the thermoplastic applique retains greater than or equal to about 80% gloss retention.

18. The method according to claim 14, wherein the applied heat is from a plurality of auxiliary induction heating elements.

19. The method according to claim 14, wherein the cooling fluid is water at a temperature of about 5° C.

20. The method according to claim 14, wherein the forming tool is an injection mold.

\* \* \* \* \*

UNITED STATES PATENT AND TRADEMARK OFFICE
CERTIFICATE OF CORRECTION

PATENT NO. : 11,338,489 B2
APPLICATION NO. : 16/534484
DATED : May 24, 2022
INVENTOR(S) : Richard Gall et al.

It is certified that error appears in the above-identified patent and that said Letters Patent is hereby corrected as shown below:

On the Title Page

(72) Inventor, "Dave Brian Glickman" should be --David Brian Glickman--

Signed and Sealed this
Twenty-fifth Day of October, 2022

Katherine Kelly Vidal
*Director of the United States Patent and Trademark Office*